United States Patent
Kosarek et al.

(10) Patent No.: US 10,628,745 B2
(45) Date of Patent: Apr. 21, 2020

(54) DATA CLASSIFICATION WITH SOCIAL PROFILE DATA

(71) Applicant: FMR LLC, Boston, MA (US)

(72) Inventors: Travis Kosarek, Boston, MA (US); Morgan Boushka, Boston, MA (US); Carolyn Manis Sorensen, Boston, MA (US)

(73) Assignee: FMR LLC, Boston, MA (US)

(*) Notice: Subject to any disclaimer, the term of this patent is extended or adjusted under 35 U.S.C. 154(b) by 993 days.

(21) Appl. No.: 15/172,893

(22) Filed: Jun. 3, 2016

(65) Prior Publication Data

US 2017/0351954 A1   Dec. 7, 2017

(51) Int. Cl.
*G06F 15/18* (2006.01)
*G06N 5/02* (2006.01)
*G06Q 50/00* (2012.01)
*G06N 5/04* (2006.01)

(52) U.S. Cl.
CPC .............. *G06N 5/022* (2013.01); *G06N 5/04* (2013.01); *G06Q 50/01* (2013.01)

(58) Field of Classification Search
CPC .............................. G06N 5/022; G06F 16/288
USPC ...................................................... 706/15, 45
See application file for complete search history.

(56) References Cited

U.S. PATENT DOCUMENTS

2014/0164519 A1*  6/2014  Shah ............... H04L 67/306
                                                   709/204
2014/0337973 A1*  11/2014  Foster ............... H04L 63/14
                                                   726/22

OTHER PUBLICATIONS

Social login—Wikipedia, http://en.wikipedia.org/wiki/Social_login, pp. 1-5, downloaded Jan. 9, 2015.
Using Social to Improve User Experience on Your Website / Social Media Today, http://www.socialmediatoday.com/content/using-social-improve-user-experience-your-webs . . . ,pp. 1-4, downloaded Jan. 9, 2015.

* cited by examiner

*Primary Examiner* — David R Vincent
(74) *Attorney, Agent, or Firm* — Proskauer Rose LLP (57) ABSTRACT

A method of processing data by one or more data processing systems for classification of the processed data into one or more predefined classifications, the method comprising: receiving by one or more data processing systems social profile data; binding by the one or more data processing systems based on the input social profile data, values of one or more attributes included in the social profile data to one or more parameters of a classifier executing on the one or more data processing systems; classifying data representing the user into one or more predefined classifications; for one of the predefined classifications into which the data representing the user is classified, identifying by the one or more data processing systems a candidate action included in the predefined classification and unassociated with the user; and transmitting an alert to notify the user of the candidate action.

17 Claims, 8 Drawing Sheets

FIG. 8

DATA CLASSIFICATION WITH SOCIAL PROFILE DATA

BACKGROUND

A classifier maps input data to a category. There are various types of classifiers, including, linear discriminant classifiers, support vector machine classifiers, nearest neighbor classifiers, ensemble classifiers, and so forth.

SUMMARY

In some examples, a method of processing data by one or more data processing systems for classification of the processed data into one or more predefined classifications includes receiving by one or more data processing systems social profile data; binding by the one or more data processing systems based on the input social profile data, values of one or more attributes included in the social profile data to one or more parameters of a classifier executing on the one or more data processing systems; classifying by the one or more data processing systems data representing the user into one or more predefined classifications; for one of the predefined classifications into which the data representing the user is classified, identifying by the one or more data processing systems a candidate action included in the predefined classification and unassociated with the user; and transmitting, by the one or more data processing systems to the client device over one or more computerized networks, an alert to notify the user of the candidate action. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One or more aspects of this implementation include one or more of the following actions and/or features. classification by removing those one or more candidate actions corresponding to one or more actions associated with a user profile of the user; from among the filtered data representing the candidate actions, selecting an item of data representing one of the remaining candidate actions; generating the alert from the filtered, selected data, with the alert comprising a universal resource locator (URL), which specifies a location of a system for activating the selected action; wherein transmitting comprises transmitting the alert over a wireless communication channel to a wireless device associated with the user based upon a destination address of the wireless device; wherein the alert activates a finance viewer application to cause the alert to display on the wireless device and to enable connection via the URL to the system over the Internet when the wireless device is online. The user is a first user, wherein the system of identity provider is a social networking system, and wherein applying the classifier comprises: receiving, from the social networking system, data specifying a second user with a shared connection within a predefined amount of degrees of separation between a node representing the first user in a social graph for a social network of the social networking system and a node representing the second user in the social graph for the social network; and identifying, in a profile of the second user, one or more actions associated with the second user, with the profile of the second user being stored in a data repository of the one or more computerized systems; wherein identifying the candidate action comprises selecting at least one of the or more actions associated with the second user; and wherein transmitting comprises transmitting to the client device of the first user an alert notifying the first user of the selected at least one of the or more actions associated with the second user. The predefined amount of degrees of separation is one degree of separation.

The actions include transmitting, by the one or more data processing systems to the client device, data for a graphical user interface that when rendered on the client device displays one or more selectable controls for entering credentials by which an identity provider verifies that a user associated with the credentials is an authorized user of a system of the identity provider; receiving, from the system of the identity provider, authentication data specifying that the user is the authorized user; and requesting, from the system of the identity provider, social profile data of the user. The actions include identifying in the social profile data one or more attributes of the user; applying one or more rules to the one or more attributes; and identifying, based on application of the one or more rules, one or more suggested actions for the user. The system of the identity provider is a social networking system, and wherein the method further comprises: monitoring trending topics on the social networking system; and causing data related to the trending topics to be presented to the user through one or more graphical user interfaces for which data is generated by the one or more computerized systems. The actions include confirming that the user is a user of the social networking system. The system of the identity provider is a social networking system, and wherein the method further comprises: receiving, from the social networking system, social content data specifying one or more interests of the user in the social networking system, data shared by the user with other users in the social networking system, one or more comments posted by the user in the social networking system, and tagged data posted by the user in the social networking system; identifying other data with at least a predefined amount of relevance to the received social content data; and causing the identified other data to be presented to the user. Each of the one or more computerized systems differs from the system of the identity provider. Other embodiments of these aspects include corresponding computer systems, machine-readable hardware storage devices and apparatus, each configured to perform the foregoing actions.

All or part of the foregoing may be implemented as a computer program product including instructions that are stored on one or more non-transitory machine-readable storage media and/or one or more machine-readable hardware storage devices that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages of the techniques described herein will be apparent from the description and drawings, and from the claims.

DETAILED DESCRIPTION

One or more data processing systems consistent with this disclosure receive real-time social profile data from one or more external systems. The real-time social profile data is received in a real-time data stream. One or more data processing systems process the received stream of data to classify the received data (or other data associated with the received data) into one or more predefined classifications.

Figure 1:
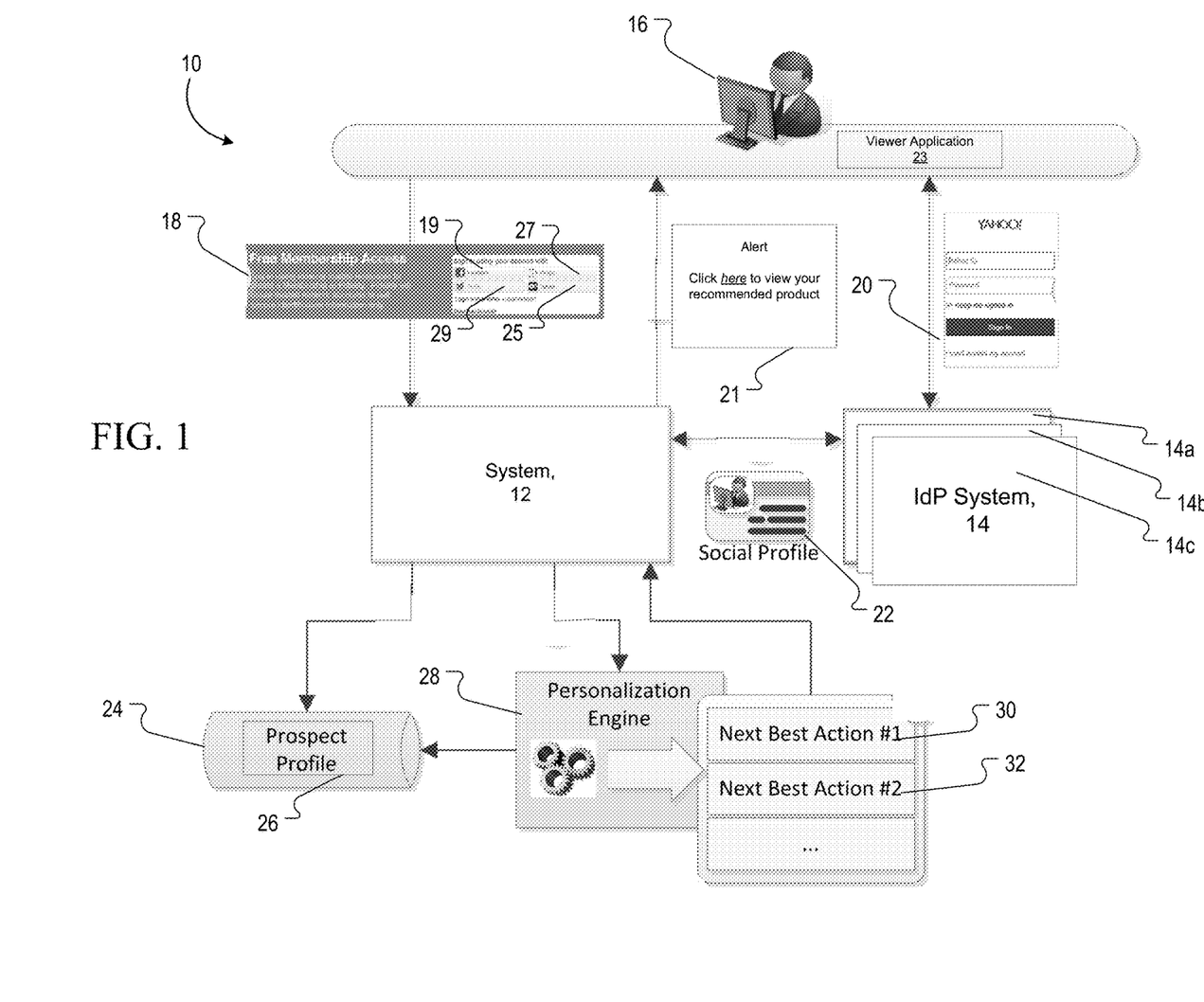
FIG. 1 is a block diagram of a system for classifying social profile data.

Referring to FIG. 1, networked system 10 includes system 12 for generating personalized content for a user of system 12. System 12 is a data processing system for processing real-time data received from various external systems, such as identity provider (IdP) system 14. Network system 10 includes client device 16 and the identity provider system 14. System 12 differs from each of client device 16 and IdP system 14. System 12 transmits to client device 16 a web page 18 for accessing one or more services or functionalities of system 12. Prior to granting access to system 12, system 12 verifies that the user requesting access is an authenticated user of one or more identity providers.

To do so, web page 18 includes selectable controls 19, 25, 27, 29 for entering credentials by which identity providers associated with corresponding identity provider systems 14 verify that a user associated with the credentials is an authorized user of the corresponding identity provider system 14 of the identity provider.

Upon selection of one of controls 19, 25, 27, 29, system 12 sends to a corresponding IdP system 14 data specifying that client device 16 requests to authenticate to system 12 using credentials granted to the user of client device 16 by the corresponding IdP system 14. System 12 also sends to IdP system 14 data specifying a session identifier for the session established between system 12 and client device 16. In response, IdP system 14 sends to client device 16 login data that when rendered on a display device of client device 16 displays graphical user interface 20 for entering credential data, such as social login data, of the user. The entered credential data is transmitted from client device 16 to IdP system 14. In response to receiving the entered credential data, IdP system 14 verifies that the user associated with client device 16 is an authorized user of IdP system 14, and thus, is also an authorized user of system 12. IdP system 14 performs user authentication by querying its database for credential data that matches or that corresponds to the credential data received from client device 16.

In response to verifying the user, IdP system 14 sends to system 12 authentication data specifying that the user associated with client device 16 is an authorized user of IdP system 14. IdP system 14 also sends to system 12 the session identifier that is associated with the request to authenticate the user associated with client device 16. Based on this received authentication data for this session identifier, system 12 grants client device 16 access to system 12 and/or access to various functionalities and applications in system 12. Additionally, system 12 performs a look up in data repository 24 of a profile for the user that is requesting and has been granted access to system 12. The profile is stored in data repository 24 as profile data 26. Using profile data 26, system 12 generates data for one or more graphical user interfaces that are customized based on profile data 26 (profile 26).

To further customize data that is transmitted to client device 16, system 12 requests profile data from IdP system 14. The request includes the session identifier, to enable IdP system 14 to verify that system 12 is requesting data for the same user for which IdP system 14 previously authenticated the user. In a variation, graphical user interface 20 includes one or more selectable portions through which a user may grant system 12 access to its profile data of IdP system 14. In this variation, upon receiving the request for the profile data, IdP system 14 determines whether the user granted system 12 access to its profile data as part of the login process. This requested profile data is for a profile of the user associated client device 16 and is generated by IdP system 14. For example, IdP system 14 may be a social networking system. In this example, the profile data requested by system 12 is social profile data. In response to receiving the request, IdP system 14 transmits, to system 12, social profile data 22, e.g., in a real-time data stream.

Using profile data 22, system 12 further customizes data for the user associated with client device 16 and also generates one or more recommended actions. System 12 includes personalization engine 28, which is configured to analyze and use profile data 22 in generating various recommended actions 30, 32.

There are various ways in which personalization engine 28 generates the recommended actions, based on the received profile data 22. Profile data 22 includes various types of data, including, demographics data (geographic location data, gender data, age data, email provider data, and so forth), and social networking data (data specifying comments posted in the social network, topics of interest in the social network, posts shared in the social network, data tagged in the social network, and so forth). System 12 includes predefined user classifications, for example, based on demographics data and attributes for users. One user classification is for females under the age of 30 located in California. Another user classification is for males under the age of 18 who speak English.

A predefined user classification is associated with various actions, based on the actions performed or associated with other users who are already classified into that predefined user classification. The actions associated with a particular user classification are those actions that at least one user in the classification has performed or is otherwise associated with. As such, the actions for a particular classification are dependent on the actual actions associated with real users who are classified into that classification. The below Table 1 illustrates various predefined user classifications and associated actions:

TABLE 1

| Predefined User Classification | Associated actions |
| --- | --- |
| Female, age: less than 30, location: California | iPad purchases |
| Male, age less than 18, language: English | Discounted wireless plan of 5k SMS/mo |

As shown in the above Table 1, various predefined user classifications are associated with various actions. These actions are candidate actions for assignment to a user as recommended action In a variation, the actions associated with a particular classification are preset and independent of the actions associated with users in that classification. For example, the actions are selected by an administrator to promote completion of certain goals or actions for particular types of user classifications.

Personalization engine 28 applies a classifier to profile data 22 of the user to classify the user into one or more predefined classifications. Personalization engine 28 applies various types of classifiers, including, for example, Naive Bayes, Nearest Neighbor, Decision Tree and Support Vector Machine (SVM). Based on application of the classifier to profile data 22, personalization engine 28 assigns data representing the user to one of the predefined classifications. Personalization engine 28 compares candidate actions associated with the predefined classification to which the user is assigned to actions already associated with the user, as specified in profile 26 of the user. Based on the comparison, personalization engine 28 selects one of the actions (e.g., one of actions 30, 32) that is associated with the classification and that is not currently associated with or included in profile 26 of the user. System 12 generates an alert to notify the user of the selected action and transmits to client device 16 the alert.

System 12 filters data representing candidate actions included in the predefined classifications by removing those one or more candidate actions corresponding to one or more actions associated with a user profile of the user, as shown in the below Table 2.

TABLE 2

| Candidate Actions | User Profile Actions |
|---|---|
| ~~Upgrade monthly data plan~~, View news articles on wireless technology, iPad purchases | Recently upgraded monthly data plan |

As shown in the above Table 2, the user profile specifies that the user is currently associated with an action of having recently upgraded a monthly data plan. Based on the classification to which the user is assigned, the candidate actions are the associated actions for the assigned classification, which are the actions of upgrade monthly data plan, view news articles on wireless technology, and iPad purchases. The candidate actions are filtered to remove "upgrade monthly data plan" as a candidate action, because the "upgrade monthly data plan" action is already associated with the user profile. From among the filtered data representing the remaining candidate actions, system 12 selects an item of data representing one of the remaining candidate actions (i.e., an action of view news articles on wireless technology or iPad purchases).

System 12 generates alert 21 from the filtered, selected data, with the alert comprising a link encoded with a universal resource locator (URL), which specifies a location of a system (e.g., system 12) for viewing and/or activating (e.g., purchasing, initiating, etc.) the selected action.

System 12 transmits alert 21 over a wireless communication channel of a network to a wireless device (e.g., client device 16) associated with the user based upon a destination address (e.g., an IP address) of the wireless device. Alert 21 activates viewer application 23 on client device 16 to cause alert 21 to display on a display device of client device 16 and to enable connection via the URL to system 12 over the Internet when client device 16 is online. Viewer application 23 is downloaded from system 12 and is software dedicated to communication with system 12. Viewer application 23 renders one or more graphical user interfaces that display visual representations pertaining to the recommended (selected) actions and the recommended actions. In a variation, viewer application 23 is browsing software for rendering one or more graphical user interfaces. By using social profile data to classify a user, system 12 performs user classification using fewer resources that would be required if system queried a data repository for the social profile data. Here, system 12 receives social profile data as a real-time data stream and stores the received data on disk or in a cache, thereby allowing system 12 to process the social profile data in real time and without the latency of having to do a database query and retrieval for the social profile data. Following processing of the social profile data, system 12 deletes or removes the social profile data received from system 14, thereby providing for storage of fewer resources than would be required if the user was inputting its own social profile data into system 12, which would require the system 12 store the input data.

Figure 2:
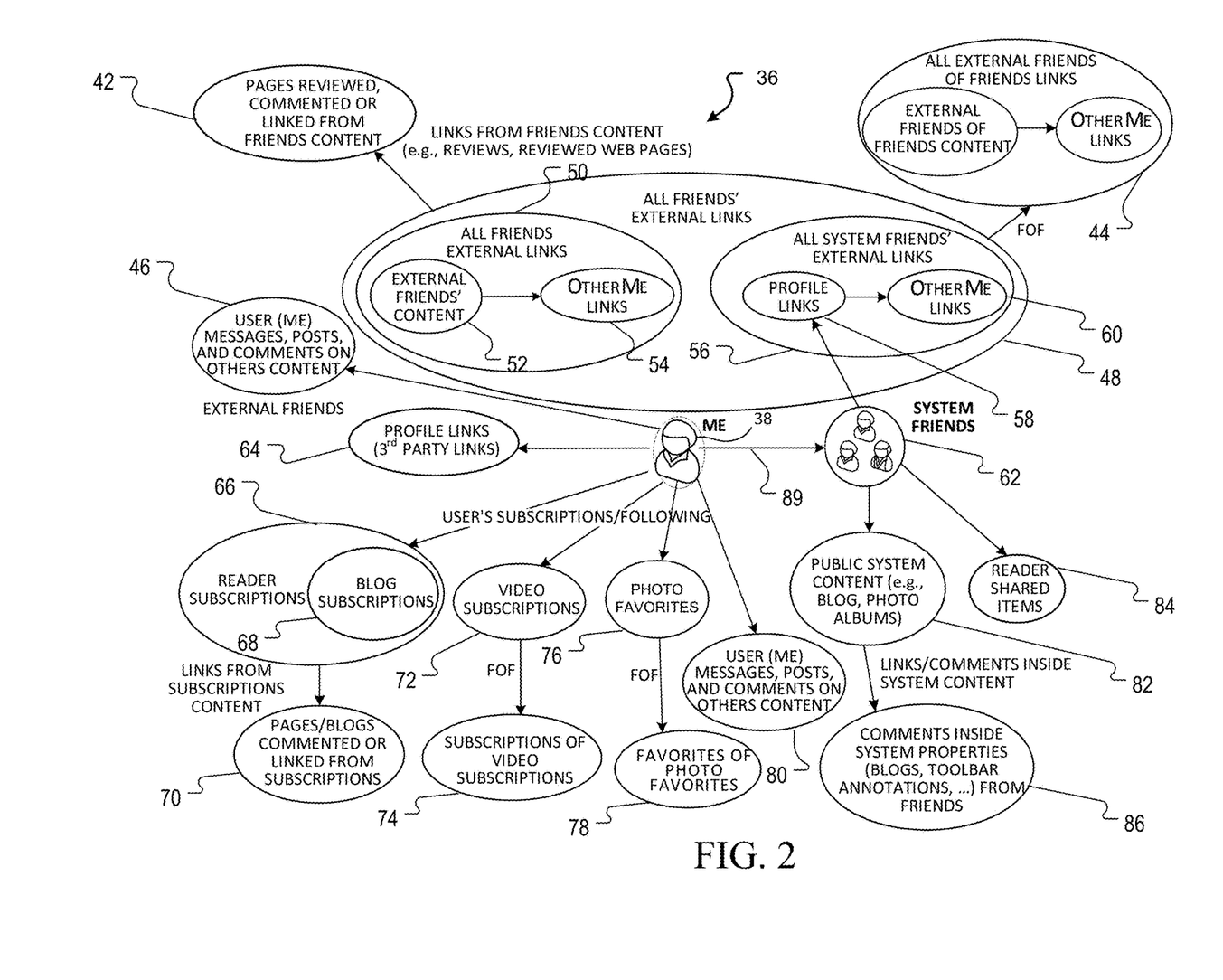
FIG. 2 is a diagram of a social networking graph.

Referring to FIG. 2, social graph 36 includes nodes 38-86. A node is a representation in social graph 36 of a user of the social network, data posted in the social network comments and shares posted in the social network, data viewed through the social network and so forth. Social graph 36 is a collection of connections (e.g., users, resources/content, etc.) identified as having a relationship to node 38 within some degree of separation. Node 38 represents a particular user of the social network and that user's social connections or relationships to other users and data in the social network. Node 38 is connected via directed edge 89 to node 62, representing friends of the user represented by node 38. Other directed edges in social graph 36 connect node 38 either directly or indirectly to one or more of nodes 42-86. A directed edge between two nodes represents a social connection between entities represented by those respective nodes. A social connection is a relationship between nodes in social graph 36 representing users of a social networking service or items of data posted in (or otherwise associated with) a social networking service.

There are various sources of data for social graph 36. The user's social graph includes parties and particular content at different degrees of separation. The social graph of a user includes contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

The user's social graph 36 is extended to people and content both within a single network and across one or more external networks. The user has a profile or contacts list that includes a set of identified contacts, a set of interests, a set of links to external resources (e.g., Web pages), and subscriptions to content of a system (e.g., a system that provides various content and applications including electronic messages, chat, video, photo albums, feeds, or blogs). Blogs that include links to a user's contacts are part of the user's social graph. These groups are connected to other users or resources at another degree of separation from the user. Contacts of the user have their own profiles that include connections to resources as well as contacts of the respective contacts, a set of interests, and so forth. A user is connected to a social network account. That social network account references an article in a newspaper. A social connection is established between the user and the author of the article.

The connections to a user within a specified number of degrees of separation are the bounds of the social graph of a user. Membership and degree of separation in the social graph are based on other factors, including a frequency of interaction. A frequency of interaction is by the user (e.g., how often the user visits a particular social networking site) or it is a type of interaction (e.g., endorsing, selecting, or not selecting items associated with contacts). As interactions change, the relationship of a particular contact in the social graph also dynamically changes. The social graph is dynamic rather than static.

Social graphs are stored using suitable data structures (e.g., list or matrix type data structures). Data describing an aspect of a stored social graph is relationship data. Relationship data includes data describing how particular members of a user's social graph are connected to a user (e.g., through what social path is a particular entity connected to the user). Relationship data also includes data describing social signals incorporated in the user's social graph. Relationship data is stored in a relationship lookup table (e.g., a hash table). Suitable keys for locating values (e.g., relationship data) within the lookup table include data describing the identities of both a user and a member of the user's social graph. A suitable key for locating relationship data within the lookup table is (User X, User Y), where User Y is a member of User X's social graph.

Social graph data, including that described above, is indexed for use in data retrieval. The social graph data may be part of an index stored in data repository of IdP system 14 and/or data repository 24. Generally, IdP system 14 includes one or more systems, e.g., one or more of system 14a, 14b, and 14c. The index is queried (by system 12 or IdP system 14) to identify content that is associated with one or more aspects of a user's social graph, to identify other users socially connected to a user (for whom system 12 is generating a recommended action), to identify posts, shared content, tagged keywords of a user, and so forth. The user-specific content includes content from electronic messages, posts, blogs, chats. The indexed social graph data is updated intermittently or periodically to include recently added data associated with the user's social graph. The indexed social graph data is be updated, e.g., on an on-going basis to reflect relationships determined in accordance with the processes described herein.

IdP system 14 includes various types of systems, such as a social networking system. System 12 queries IdP system 14 for data specifying other users with a shared connection within a predefined number of degrees of separation (e.g., one degree of separation) between node 38 in social graph 36 of the social networking system and nodes representing the other users in the social graph for the social networking system. Using this queried data, system 12 determines whether one of the other users is a registered user of system 12 with a stored profile in data repository 24. When system 12 detects that the other user is a registered user, system 12 retrieves the user profile for this other user and identifies, in the profile of the other user, one or more actions associated with the other user. System 12 identifies for a user represented by node 38 a candidate action by selecting at least one of the one or more actions associated with the other user. System 12 transmits to a client device of the user represented by node 38 an alert notifying the user of the selected at least one of the one or more actions associated with the other user.

IdP system 14 transmits to system 12 a social profile of the user associated with client device 16. System 12 identifies in the social profile data one or more attributes of the user and applies one or more rules to the one or more attributes. System 12 identifies the attributes using various techniques, including, by scanning the social profile data for one or more predefined keywords. There are various types of rules that may be applied, including that shown in the below Table 3:

TABLE 3

Rules

If ATTRIBUTES = (Read OR Posted) Re: saving for college, then RECOMMENDED
ACTION = open a college savings account As shown in the above Table 3, attributes of reading or posting about saving for college are associated with the recommended action of opening a college savings account. System 12 identifies, based on application of the one or more rules, one or more suggested actions for the user. System 12 also monitors trending topics on IdP system 14 by receiving from IdP system 14 data specifying one or more trending topics in the social network, one or more trending topics that the user has viewed, one or more trending topics that friends of the user have viewed, one or more trending topics that friends of friends (FOF) of the user have viewed, and so forth. System 12 generates data for a graphical user interface that when rendered on a display device displays data or recommended actions relating to the trending topics.

System 12 also receives, from the social networking system, social content data specifying one or more interests of the user in the social networking system, data shared by the user with other users in the social networking system, one or more comments posted by the user in the social networking system, and tagged data posted by the user in the social networking system. System 12 identifies other data (one or more recommended actions) with at least a predefined amount of relevance to the received social content data, by applying the received data (which includes attributes) to the rules. System 12 causes the identified other data to be presented to the user through one or more graphical user interfaces.

Figure 3:
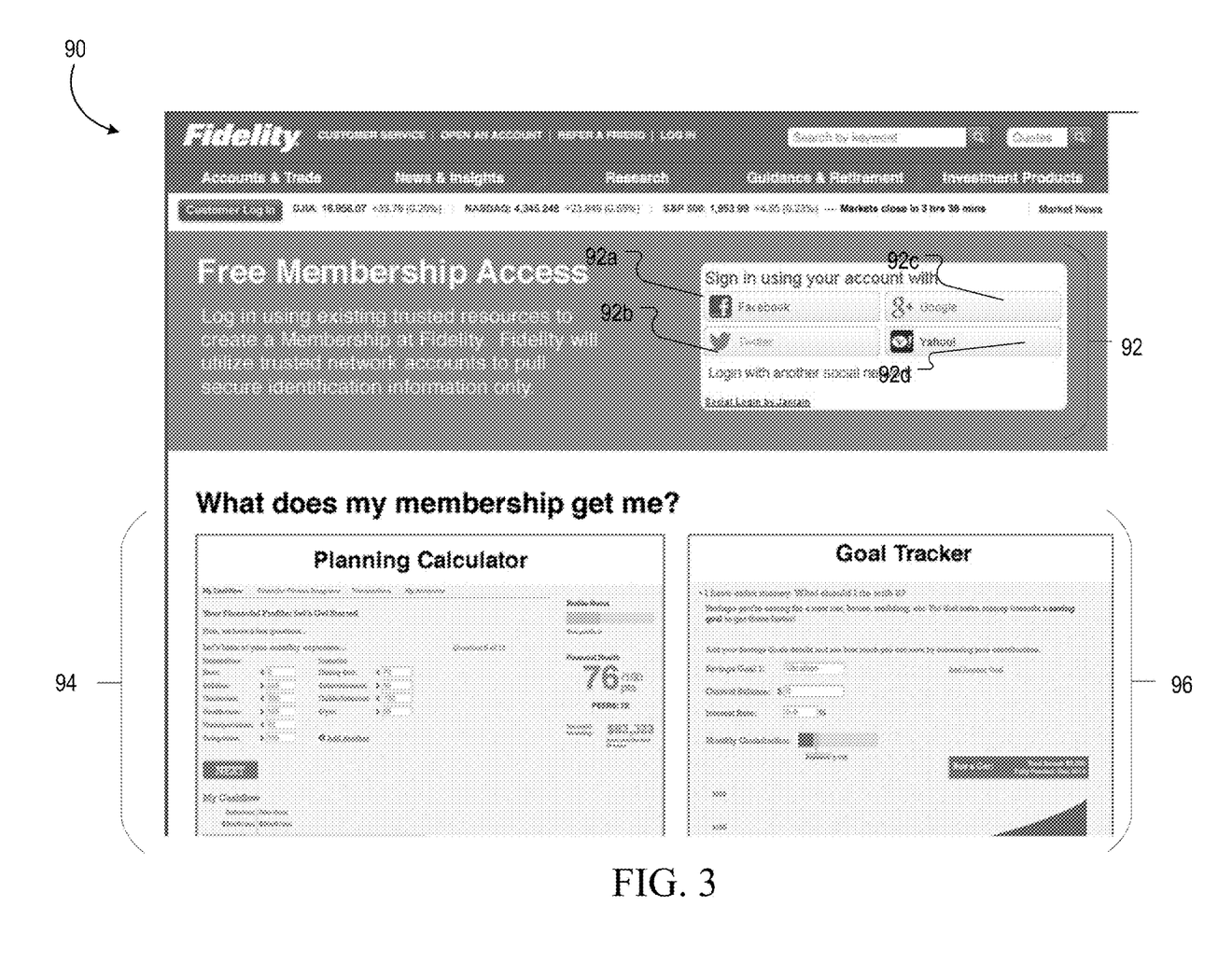
FIGS. 3-6 are graphical user interfaces of the system for classifying social profile data.

Referring to FIG. 3, graphical user interface 90 is rendered on a device, based on data for graphical user interface 90 generated by system 12. Graphical user interface 90 includes login portion 92 with icons 92a, 92b, 92c, 92d. Graphical user interface 90 also includes portions 94, 96 that display various functionalities a user can access, once the user is logged in and is a member of system 12. Icons 92a, 92b, 92c, 92d enable a user to use social log data to access one or more applications or functionalities of system 12 via graphical user interface 90. Upon selection of one of icons 92a, 92b, 92c, 92d, system 12 or client device 16 sends a login request to a system of a social network represented by the selected icon. The login request includes a session identifier for the web session displaying graphical user interface 90.

Figure 4:
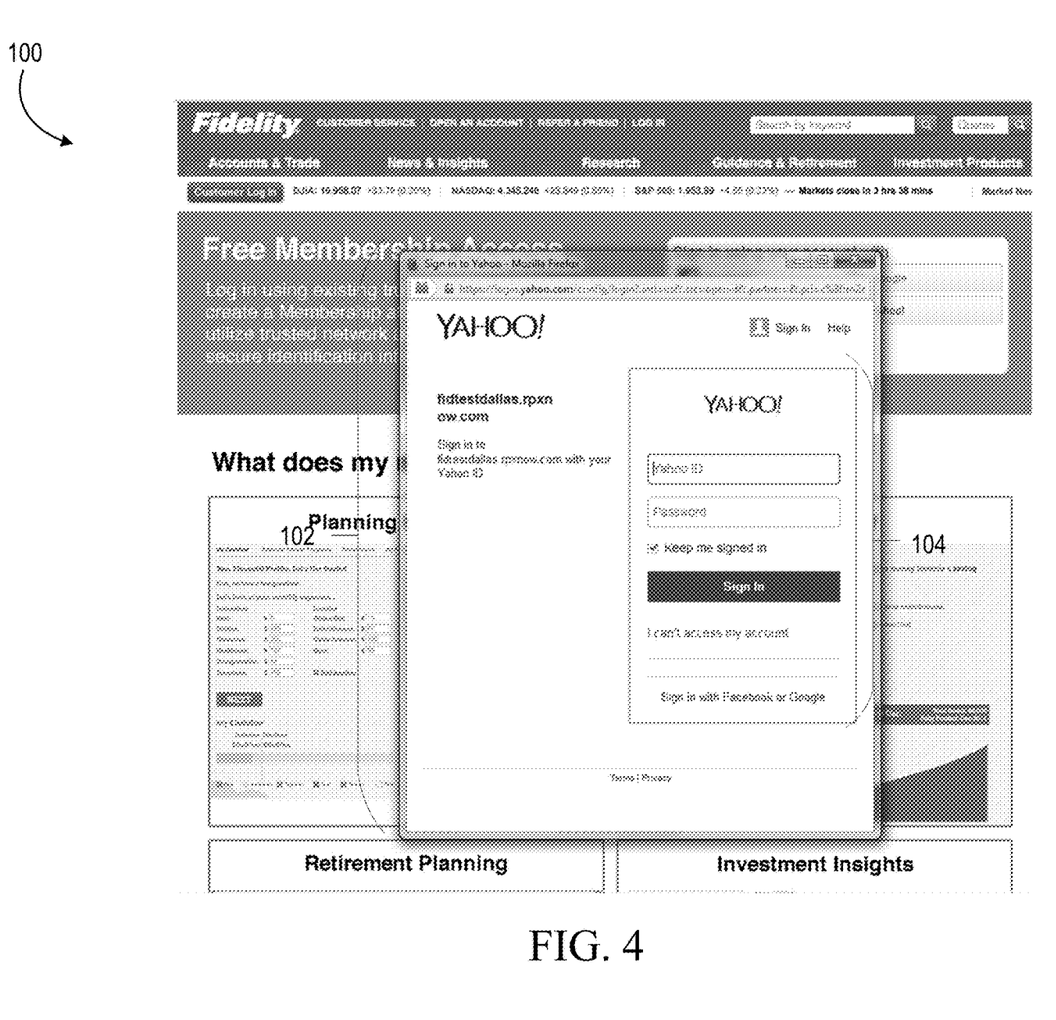

Referring to FIG. 4, graphical user interface 100 displays overlay 102 for a user to enter social login data to access system 12. Upon receiving the login request, IdP system 14 generates data for overlay 102 and transmits the generated data to client device 16 for rendering of overlay 102. Overlay 102 includes portion 104 for entry social login credentials—user ID and user password. Upon entry of the user ID and user password, the user selects login control 105 to request that the user's social login credentials be used in authenticating the user to system 12. Upon selection of login control 105, client device 16 sends to IdP system 14 the entered user ID and user password. Based on the user ID and user password, IdP system 14 confirms that the user is a user of the social networking system and notifies system 12 that the user requesting access is an authorized user of IdP system 14.

Figure 5:
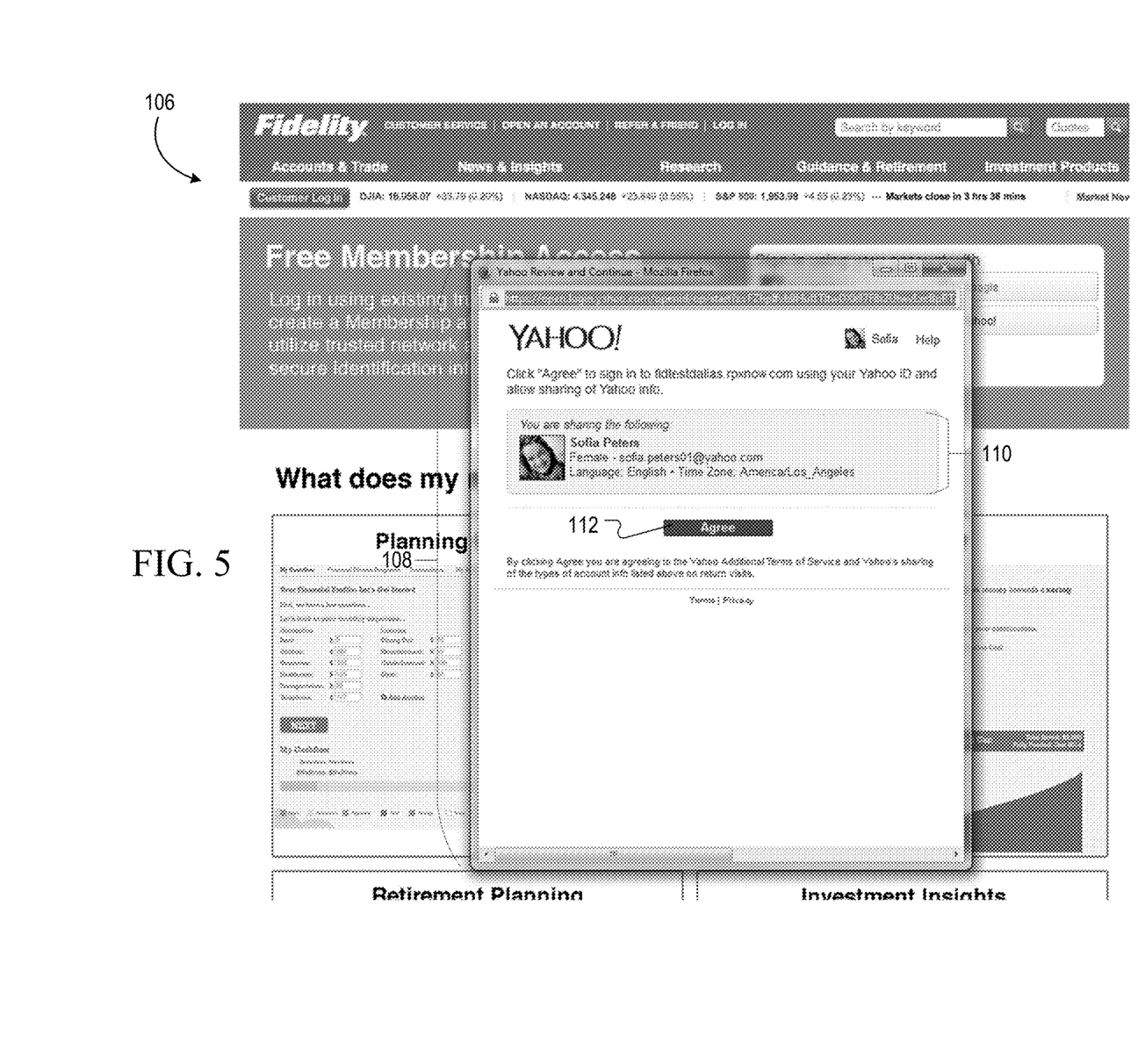

Referring to FIG. 5, graphical user interface 106 displays overlay 108 that alerts the user of the data that the user shares with system 12 by using social login to access system 12. Overlay 108 is displayed following selection of login control 105 (FIG. 4). Overlay 108 includes portion 110 specifying which types of social profile data are shared with system 12. Portion 110 specifies that name data, gender data, email data, language data, and time zone data are shared with system 12, pending user approval. Overlay 108 also includes control 112, selection of which sends to IdP system 14 data specifying that the user agrees to share this data with system 12. Upon selection of control 112, IdP system 14 sends this shared data to system 12. System 12 analyzes and scans this shared data for one or more keywords and/or various attributes, e.g., to which a rules engine applies rules or classifiers to identify various recommended actions.

Figure 6:
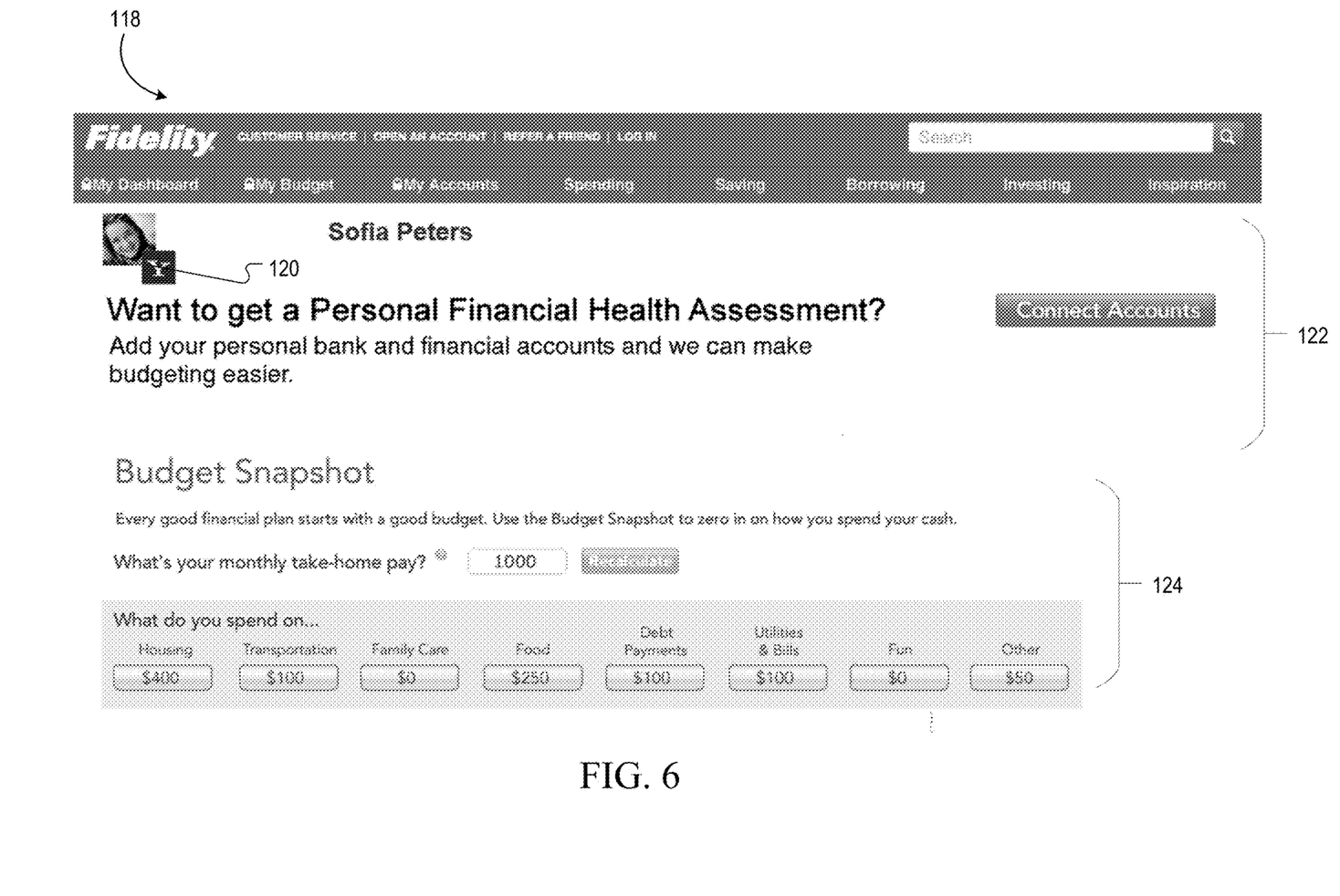

Referring to FIG. 6, graphical user interface 118 displays data that is accessible to the user, after the user has logged in with credentials provided by the identity provider. Graphical user interface 118 displays visual representation 120 to indicate which social network was used in authenticating the user to system 12. Graphical user interface 118 also displays portion 122 to notify the user of various assessments that are available to the user. Graphical user interface 118 also displays portion 124 that displays to the user snapshot data.

Figure 7:
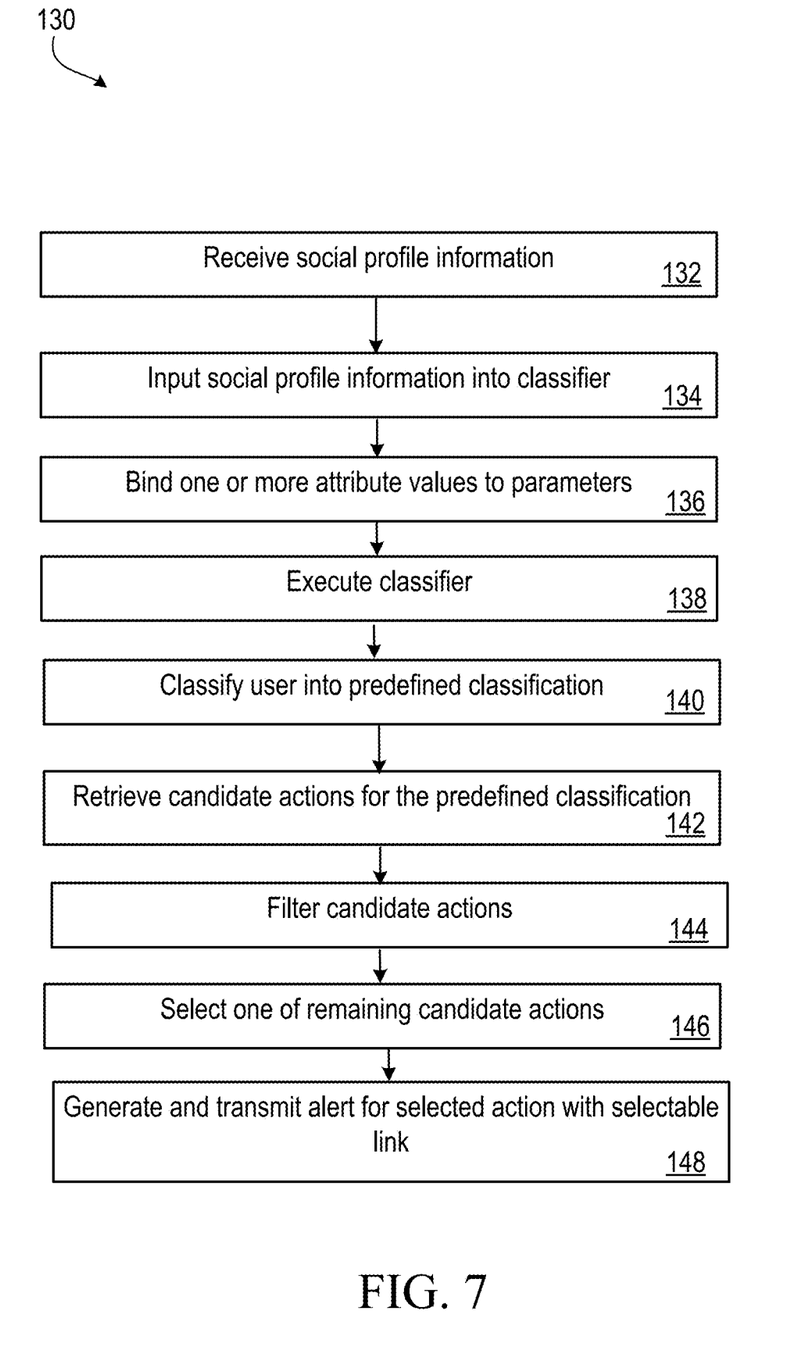
FIG. 7 is a flow diagram of a process for classifying social profile data.

Referring to FIG. 7, system 12 implements process 130 is classifying users based on social profile data. In operation, system 12 receives (132), from IdP system 14, social profile data of a user. System 12 inputs (134) the received social profile data into a classifier program stored on system 12 or accessible to system 12. System 12 scans the social profile data to identify various values of attributes of the user. The attributes include gender, language, geographic location and so forth. For these attributes, respective values are female, English, and Boston. Based on the input social profile data, system 12 binds (e.g., sets or associates) (136) values of one or more attributes included in the social profile data to one or more parameters of the classifier. Generally, a classifier includes one or more parameters, the values for which are determined from contents of the input data.

System 12 executes (138) the classifier by applying the classifier to one or more bound values of the one or more parameters. System 12 classifies (140) data representing the user (e.g., as stored in repository 24) into one or more predefined classifications. For one of the predefined classifications into which the user is classified, system 12 identifies a candidate action included in the predefined classification and unassociated with the user. System 12 retrieves (142) candidate actions for the predefined classification. System 12 filters (144) data representing candidate actions included in the predefined classification by removing those one or more candidate actions corresponding to one or more actions associated with a user profile of the user.

From among the filtered data representing the candidate actions, system 12 selects (146) an item of data representing one of the remaining candidate actions. System 12 generates and transmits (148) an alert from the filtered, selected data, with the alert comprising a selectable link encoded with universal resource locator (URL), which specifies a location of system 12 for activating the selected action, e.g., by purchasing a product associated with the actions. The alert activates a viewer application of a client device to cause the alert to display on the client device and to enable connection via the URL to system 12 over the Internet when the client device is online.

Figure 8:
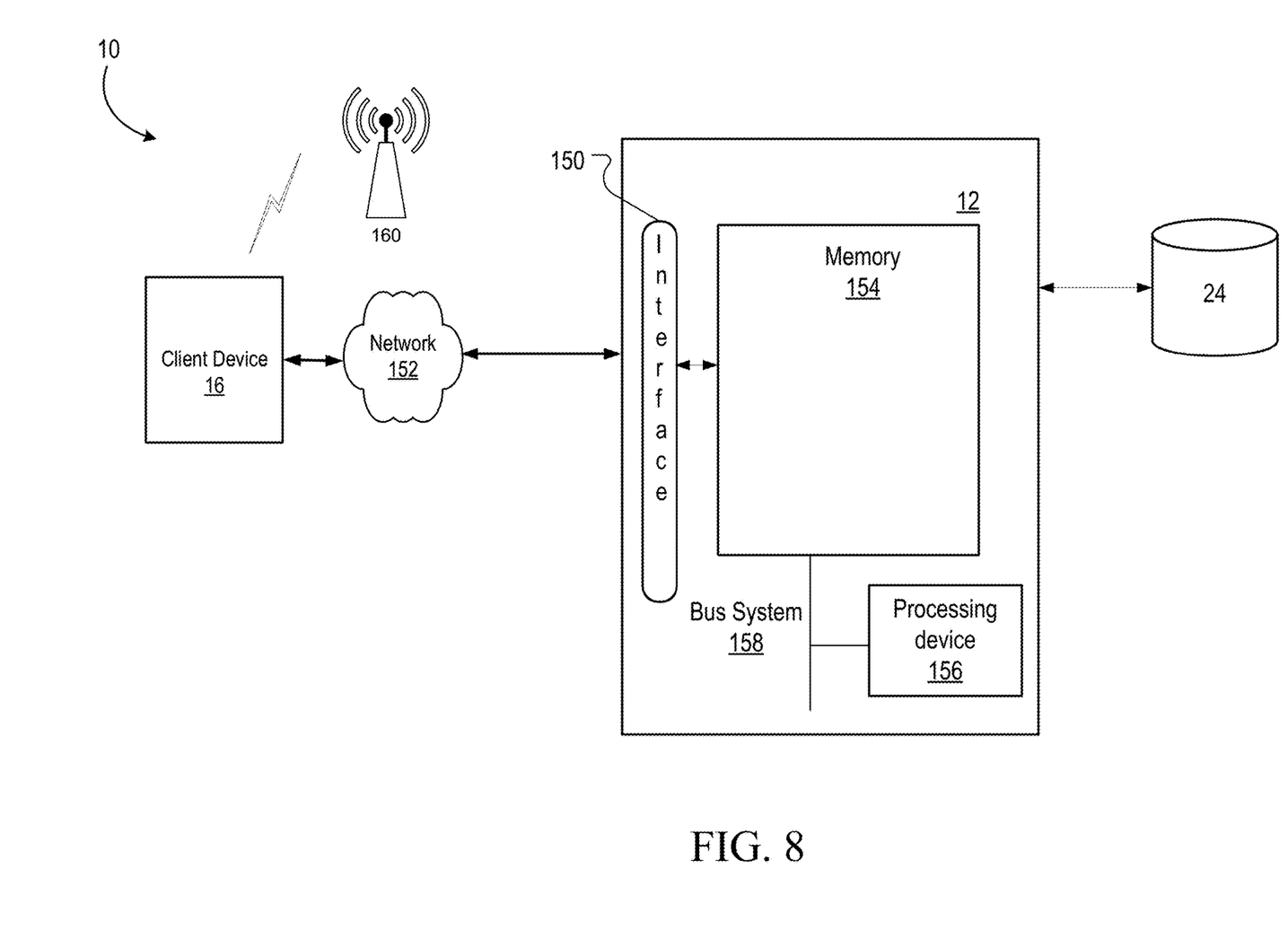
FIG. 8 is a block diagram of components of the system for classifying social profile data.

FIG. 8 is a block diagram showing examples of components of network system 10. Client device 16 can be any sort of computing device capable of taking input from a user and communicating over network 152 and/or wireless routing device 160 with system 12 and/or with other client devices. Client device 16 can be a mobile device, a desktop computer, a laptop, a cell phone, a personal digital assistant ("PDA"), a server, an embedded computing system, a mobile device and so forth.

System 12 can be a variety of computing devices capable of receiving data and running one or more services. In an example, system 12 can include a server, a distributed computing system, a desktop computer, a laptop, a cell phone, a rack-mounted server, and the like. System 22 can be a single server or a group of servers that are at a same position or at different positions (i.e., locations). System 12 and client device 16 can run programs having a client-server relationship to each other. Although distinct modules are shown in the figures, in some examples, client and server programs can run on the same device.

System 12 can receive data from wireless device 160 and/or client device 16 through input/output (I/O) interface 150. I/O interface 100 can be a type of interface capable of receiving data over a network, including, e.g., an Ethernet interface, a wireless networking interface, a fiber-optic networking interface, a modem, and so forth. System 12 also includes a processing device 156 and memory 154. A bus system 158, including, for example, a data bus and a motherboard, can be used to establish and to control data communication between the components of system 12.

Processing device 156 can include one or more microprocessors. Generally, processing device 156 can include an appropriate processor and/or logic that is capable of receiving and storing data, and of communicating over a network (not shown). Memory 154 can include a hard drive and a random access memory storage device, including, e.g., a dynamic random access memory, or other types of non-transitory machine-readable storage devices. Memory 154 stores computer programs that are executable by processing device 156. These computer programs may include a data engine (not shown) for implementing the operations and/or the techniques described herein. The data engine can be implemented in software running on a computer device, hardware or a combination of software and hardware.

In some examples, the techniques described herein provide for increased flexibility and decreased processing time by using the classified data in identifying the candidate actions, rather than using the raw social profile data in identifying actions, which would result in processing of more data (as the system would need to analyze an increased number of candidate actions to identify one that is appropriate) that would result in a lag and latency in identification of the actions. In this example, based on the classification, the system only needs to assess a subset of candidate actions, namely, those candidate actions associated with the particular classification.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode data for transmission to suitable receiver apparatus for execution by a processing device. A machine-readable medium can be a machine-readable storage device, a machine-readable storage substrate, a random or serial access memory device, or a combination of one or more of them.

The term "processing device" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, an data base management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as an data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of processing data by one or more data processing systems for classification of the processed data into one or more predefined classifications, the method comprising:
   receiving by one or more data processing systems social profile data;
   binding by the one or more data processing systems based on the input social profile data, values of one or more attributes included in the social profile data to one or more parameters of a classifier executing on the one or more data processing systems;
   classifying by the one or more data processing systems data representing the user into one or more predefined classifications;
   for one of the predefined classifications into which the data representing the user is classified, identifying by the one or more data processing systems a candidate action included in the predefined classification and unassociated with the user;
   filtering data representing candidate actions included in the predefined classification by removing those one or more candidate actions corresponding to one or more actions associated with a user profile of the user;
   filtering data representing candidate actions included in the predefined classification by removing those one or more candidate actions corresponding to one or more actions associated with a user profile of the user;
   from among the filtered data representing the candidate actions, selecting an item of data representing one of the remaining candidate actions;
   generating an alert from the filtered, selected data, with the alert comprising a universal resource locator (URL), which specifies a location of a system for activating the selected action; and
   transmitting, by the one or more data processing systems to the client device over one or more computerized networks, the alert to notify the user of the candidate action,
   wherein transmitting comprises transmitting the alert over a wireless communication channel to a wireless device associated with the user based upon a destination address of the wireless device, and
   wherein the alert activates a finance viewer application to cause the alert to display on the wireless device and to enable connection via the URL to the system over the Internet when the wireless device is online.

2. The method of claim 1, wherein the user is a first user, wherein the system of identity provider is a social networking system, and wherein applying the classifier comprises:
   receiving, from the social networking system, data specifying a second user with a shared connection within a predefined amount of degrees of separation between a node representing the first user in a social graph for a social network of the social networking system and a node representing the second user in the social graph for the social network; and
   identifying, in a profile of the second user, one or more actions associated with the second user, with the profile of the second user being stored in a data repository of the one or more computerized systems;
   wherein identifying the candidate action comprises selecting at least one of the or more actions associated with the second user; and
   wherein transmitting comprises transmitting to the client device of the first user an alert notifying the first user of the selected at least one of the or more actions associated with the second user.

3. The method of claim 2, wherein the predefined amount of degrees of separation is one degree of separation.

4. The method of claim 1, further comprising:
   transmitting, by the one or more data processing systems to the client device, data for a graphical user interface that when rendered on the client device displays one or more selectable controls for entering credentials by which an identity provider verifies that a user associated with the credentials is an authorized user of a system of the identity provider;
   receiving, from the system of the identity provider, authentication data specifying that the user is the authorized user; and
   requesting, from the system of the identity provider, social profile data of the user.

5. The method of claim 1, further comprising:
   identifying in the social profile data one or more attributes of the user;
   applying one or more rules to the one or more attributes; and
   identifying, based on application of the one or more rules, one or more suggested actions for the user.

6. The method of claim 1, wherein the system of the identity provider is a social networking system, and wherein the method further comprises:
   monitoring trending topics on the social networking system; and
   causing data related to the trending topics to be presented to the user through one or more graphical user interfaces for which data is generated by the one or more computerized systems.

7. The method of claim 6, further comprising:
   confirming that the user is a user of the social networking system.

8. The method of claim 1, wherein the system of the identity provider is a social networking system, and wherein the method further comprises:
   receiving, from the social networking system, social content data specifying one or more interests of the user in the social networking system, data shared by the user with other users in the social networking system, one or more comments posted by the user in the social networking system, and tagged data posted by the user in the social networking system;

identifying other data with at least a predefined amount of relevance to the received social content data; and causing the identified other data to be presented to the user.

9. The method of claim 1, wherein each of the one or more computerized systems differs from the system of the identity provider.

10. A data processing system for classification of the processed data into one or more predefined classifications, the data processing system comprising:

one or more processing devices; and one or more machine-readable hardware storage devices storing instructions that are executable by the one or more processing devices to perform operations comprising:

receiving social profile data;

binding based on the input social profile data, values of one or more attributes included in the social profile data to one or more parameters of a classifier executing on the one or more data processing systems;

classifying data representing the user into one or more predefined classifications;

for one of the predefined classifications into which the data representing the user is classified, identifying a candidate action included in the predefined classification and unassociated with the user;

filtering data representing candidate actions included in the predefined classification by removing those one or more candidate actions corresponding to one or more actions associated with a user profile of the user;

from among the filtered data representing the candidate actions, selecting an item of data representing one of the remaining candidate actions;

generating an alert from the filtered, selected data, with the alert comprising a universal resource locator (URL), which specifies a location of a system for activating the selected action; and transmitting, to the client device over one or more computerized networks, the alert to notify the user of the candidate action, wherein transmitting comprises transmitting the alert over a wireless communication channel to a wireless device associated with the user based upon a destination address of the wireless device, and wherein the alert activates a finance viewer application to cause the alert to display on the wireless device and to enable connection via the URL to the system over the Internet when the wireless device is online.

11. The data processing system of claim 10, wherein the user is a first user, wherein the system of identity provider is a social networking system, and wherein applying the classifier comprises:

receiving, from the social networking system, data specifying a second user with a shared connection within a predefined amount of degrees of separation between a node representing the first user in a social graph for a social network of the social networking system and a node representing the second user in the social graph for the social network; and identifying, in a profile of the second user, one or more actions associated with the second user, with the profile of the second user being stored in a data repository of the one or more computerized systems;

wherein identifying the candidate action comprises selecting at least one of the or more actions associated with the second user; and wherein transmitting comprises transmitting to the client device of the first user an alert notifying the first user of the selected at least one of the or more actions associated with the second user.

12. The data processing system of claim 11, wherein the predefined amount of degrees of separation is one degree of separation.

13. The data processing system of claim 10, wherein the operations further comprise:

transmitting, by the one or more data processing systems to the client device, data for a graphical user interface that when rendered on the client device displays one or more selectable controls for entering credentials by which an identity provider verifies that a user associated with the credentials is an authorized user of a system of the identity provider;

receiving, from the system of the identity provider, authentication data specifying that the user is the authorized user; and requesting, from the system of the identity provider, social profile data of the user.

14. One or more machine-readable hardware storage devices system for classification of the processed data into one or more predefined classifications and storing instructions that are executable by one or more processing devices to perform operations comprising:

receiving social profile data;

binding based on the input social profile data, values of one or more attributes included in the social profile data to one or more parameters of a classifier executing on the one or more data processing systems;

classifying data representing the user into one or more predefined classifications;

for one of the predefined classifications into which the data representing the user is classified, identifying a candidate action included in the predefined classification and unassociated with the user;

filtering data representing candidate actions included in the predefined classification by removing those one or more candidate actions corresponding to one or more actions associated with a user profile of the user;

from among the filtered data representing the candidate actions, selecting an item of data representing one of the remaining candidate actions;

generating an alert from the filtered, selected data, with the alert comprising a universal resource locator (URL), which specifies a location of a system for activating the selected action; and transmitting, to the client device over one or more computerized networks, the alert to notify the user of the candidate action, wherein transmitting comprises transmitting the alert over a wireless communication channel to a wireless device associated with the user based upon a destination address of the wireless device;

wherein the alert activates a finance viewer application to cause the alert to display on the wireless device and to enable connection via the URL to the system over the Internet when the wireless device is online.

15. The one or more machine-readable hardware storage devices of claim 14, wherein the user is a first user, wherein the system of identity provider is a social networking system, and wherein applying the classifier comprises:

receiving, from the social networking system, data specifying a second user with a shared connection within a predefined amount of degrees of separation between a node representing the first user in a social graph for a social network of the social networking system and a node representing the second user in the social graph for the social network; and identifying, in a profile of the second user, one or more actions associated with the second user, with the profile of the second user being stored in a data repository of the one or more computerized systems;

wherein identifying the candidate action comprises selecting at least one of the or more actions associated with the second user; and wherein transmitting comprises transmitting to the client device of the first user an alert notifying the first user of the selected at least one of the or more actions associated with the second user.

16. The one or more machine-readable hardware storage devices of claim 15, wherein the predefined amount of degrees of separation is one degree of separation.

17. The one or more machine-readable hardware storage devices of claim 14, wherein the operations further comprise:

transmitting, by the one or more data processing systems to the client device, data for a graphical user interface that when rendered on the client device displays one or more selectable controls for entering credentials by which an identity provider verifies that a user associated with the credentials is an authorized user of a system of the identity provider;

receiving, from the system of the identity provider, authentication data specifying that the user is the authorized user; and requesting, from the system of the identity provider, social profile data of the user.

* * * * *